Nov. 13, 1951          L. GOTTLIEB          2,575,267
APPARATUS FOR PRODUCING CHARGED WATER
Filed Sept. 10, 1947          4 Sheets-Sheet 1

INVENTOR.
LOUIS GOTTLIEB
BY
*Leo Edelson*
ATTORNEY.

Nov. 13, 1951 — L. GOTTLIEB — 2,575,267
APPARATUS FOR PRODUCING CHARGED WATER
Filed Sept. 10, 1947 — 4 Sheets-Sheet 2

INVENTOR.
LOUIS GOTTLIEB
BY
ATTORNEY.

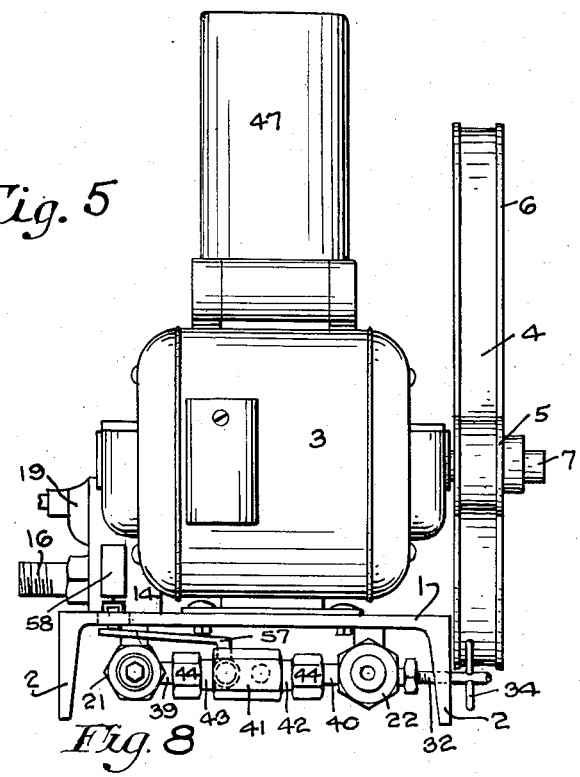
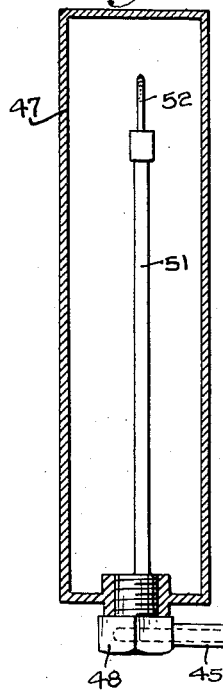
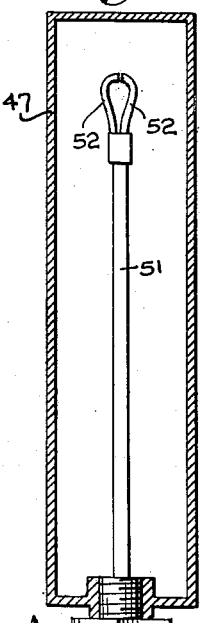
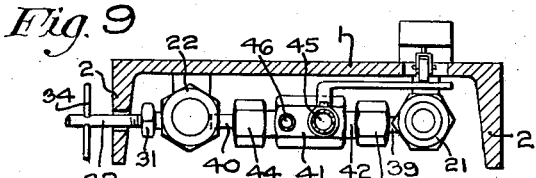
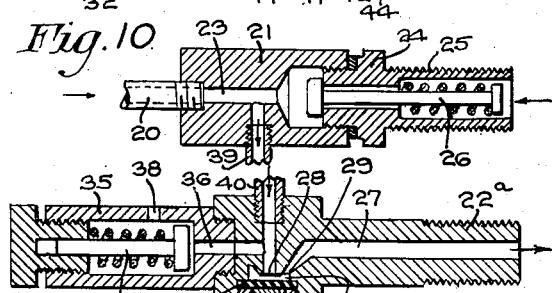
INVENTOR.
LOUIS GOTTLIEB

Nov. 13, 1951   L. GOTTLIEB   2,575,267
APPARATUS FOR PRODUCING CHARGED WATER
Filed Sept. 10, 1947   4 Sheets-Sheet 4
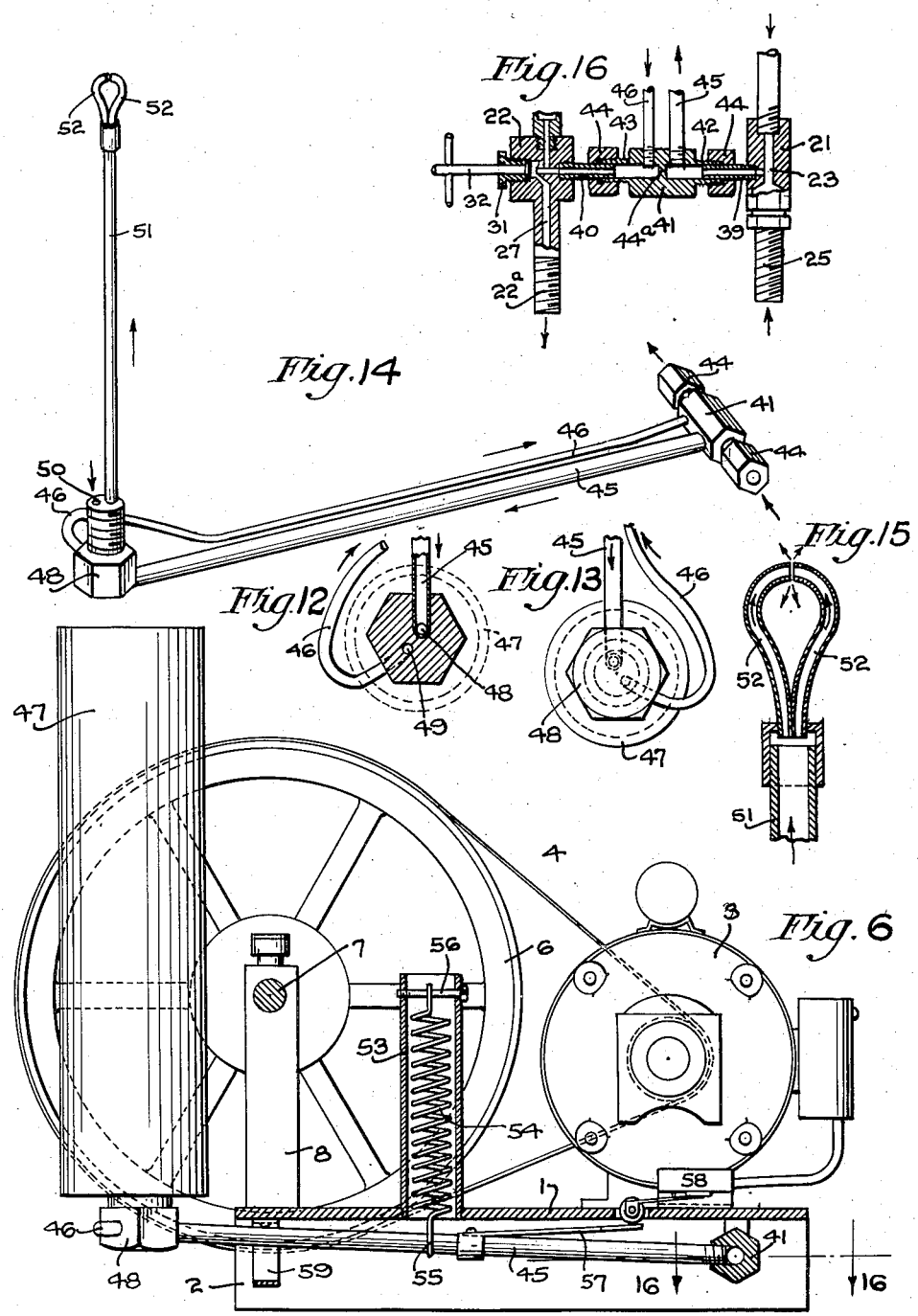
INVENTOR
BY LOUIS GOTTLIEB
ATTORNEY.

Patented Nov. 13, 1951

2,575,267

UNITED STATES PATENT OFFICE 2,575,267

APPARATUS FOR PRODUCING CHARGED WATER

Louis Gottlieb, Philadelphia, Pa.

Application September 10, 1947, Serial No. 773,237

8 Claims. (Cl. 261—19)

This invention relates to carbonating apparatus in which water and carbon dioxide under pressure is mixed to produce carbonated water for use in soda fountains or other places where carbonated water is desired.

The object of this invention is to provide a compact and efficient automatically operable apparatus by means of which water and carbon dioxide under pressure may be homogeneously mixed to provide a continuous supply of carbonated water.

It is a further object of the present invention to provide automatic apparatus by means of which streams of a mixture of gas and water under pressure are caused to impinge upon each other to provide a homogeneous mixture thereof and to provide for a maximum absorption of the gas in carbonated water.

It is a further object of the invention to provide automatic apparatus for the formation of carbonated water in which said apparatus is caused to operate when the stored supply of water has been reduced to a predetermined quantity and to cease operation automatically when the stored supply of carbonated water has been increased above said quantity.

It is still a further object of the invention to provide apparatus for the formation of carbonated water in which the storage tank therefor is movable depending upon the weight of the carbonated water accumulated therein, to automatically start or to stop the water carbonating apparatus.

These and other objects of the invention will be apparent from the following description thereof taken in connection with the accompanying drawings in which:

Figure 5 is an end view of the apparatus showing the end opposite to that shown in Figure 2;

Figure 6 is a vertical sectional view taken substantially on the line 6—6 of Figure 1;

Figure 7 is a sectional view of the carbonated water storage chamber;

Figure 8 is another sectional view of the storage chamber taken at right angles to the view of Figure 6;

Figure 9 is a sectional view of the base of the apparatus and the associated parts located therebelow taken on line 9—9 of Figure 4;

Figure 10 is a sectional view showing the carbon dioxide and water mixing valve in detail;

Figure 11 is a sectional view showing in detail the discharge valve for the carbonated water;

Figure 12 is a sectional view showing the inlet and discharge tubes in the bottom of the storage chamber taken on lines 12—12 of Figure 8;

Figure 13 is a bottom plan view of the carbonated water storage chamber;

Figure 14 is a perspective view showing the inlet and discharge tubing extending to the interior of the storage chamber;

Figure 15 is a detail sectional view showing the upper end of the inlet tube within the storage chamber; and Figure 16 is a sectional view taken on lines 16—16 of Figure 6.

Figure 1:
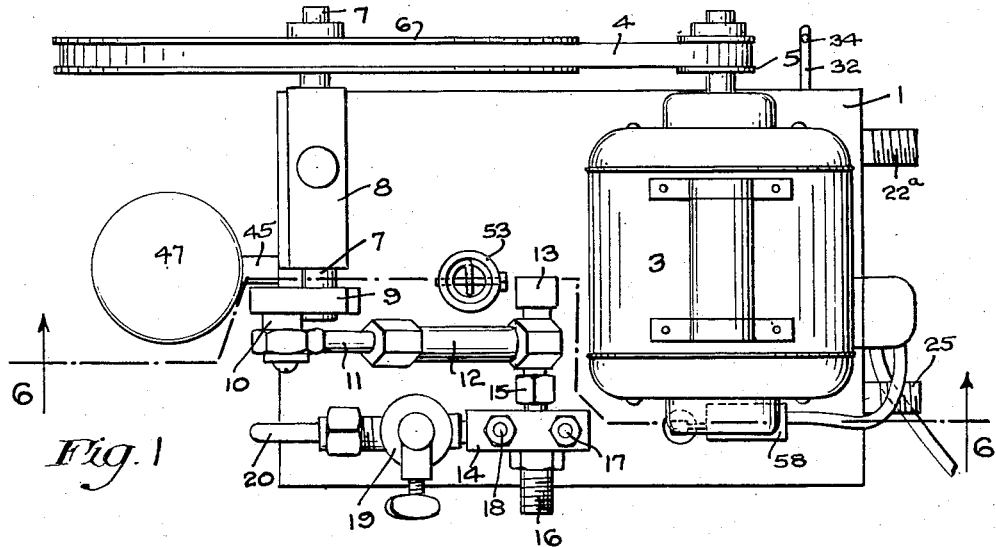
Figure 1 is a top plan view of the carbonating apparatus of the present invention.
Figure 2:
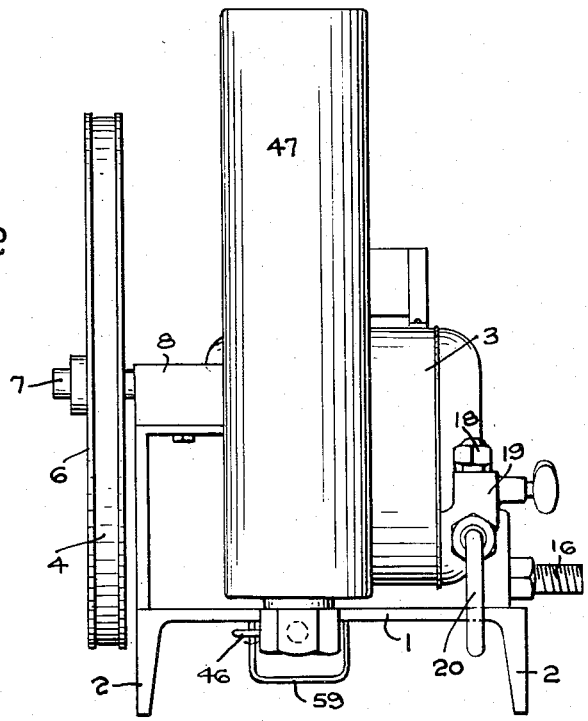
Figure 2 is an end view thereof.
Figure 3:
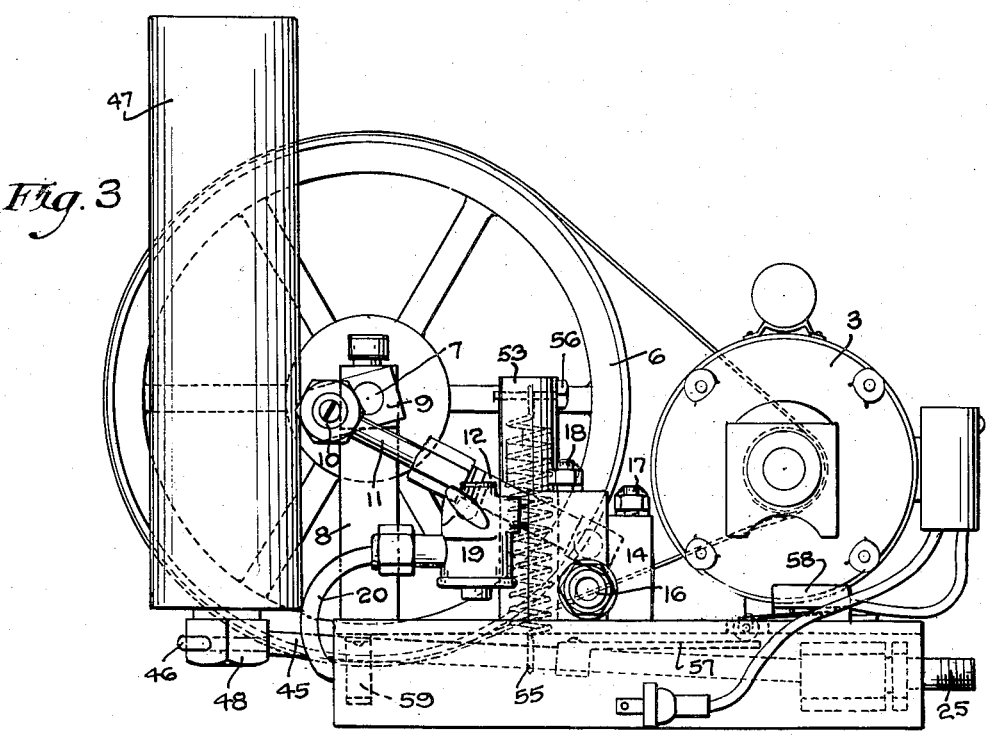
Figure 3 is a side elevational view of the same apparatus.
Figure 4:
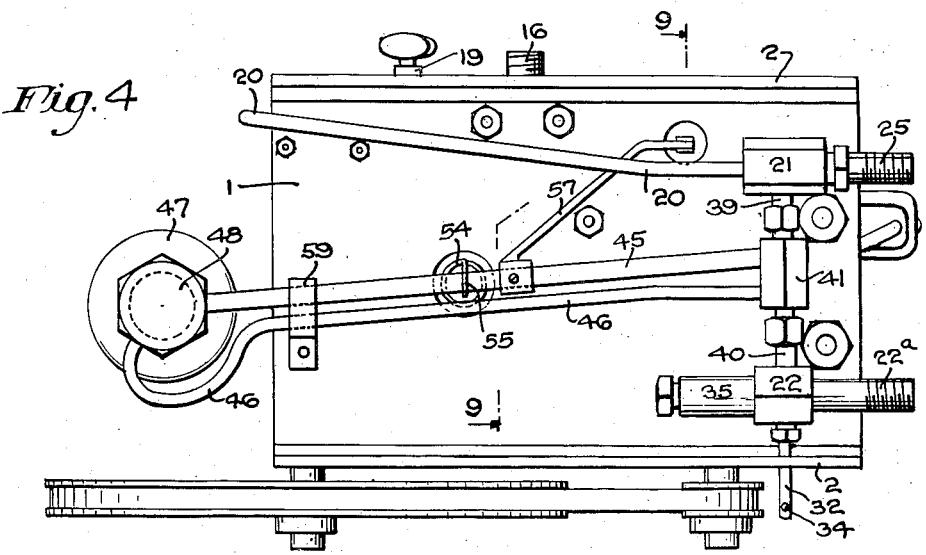
Figure 4 is a bottom plan view of the apparatus.

Referring now to the drawings, it will be observed that the carbonating apparatus of the present invention is in the form of a compact assembly of operatively associated parts suitably mounted upon a channel-shaped base 1 the depending said flanges 2—2 of which serve as supporting legs for the base. An electric motor 3 mounted upon the upper surface of the base adjacent one end thereof drives the moving parts of the apparatus by means of a belt 4 trained over the motor pulley 5 and over a second pulley 6 fixed to a shaft 7 rotatably journalled in a bearing 8, said bearing being suitably mounted upon the base at a point somewhat removed from the motor.

The shaft 7 is provided at its inner end with a crank arm 9 from the free end of which laterally projects a crank pin 10. Pivotally connected to this crank pin 10 is the piston-actuating rod 11 of a single-acting cylinder pump, the cylinder 12 of which is pivotally journalled between a bearing block 13 and a valve housing member 14, both of the latter being suitably secured to the base 1. The valve housing member 14 and the water displacement chamber of the cylinder 12 are in communication with each other by way of a suitable coupling 15. The member 14 is provided at one side thereof with a water inlet 16 and in addition is interiorly provided with a pair of valves (designated generally by the reference numerals 17 and 18) operative to insure proper circulation of the water from its source of supply (not shown) to the pump cylinder 12 from whence it is pumped under pressure by way of a check valve 19, into the water supply line 20 of the carbonating apparatus. Inasmuch as any suitable type of water pressure pump may be employed for delivering an adequate supply of water under suitable pressure into the line 20, further detailed description of the pump unit and its control valves 17 and 18 are deemed unnecessary. It may be pointed out, however that the valves 17 and 18 are preferably check-valves of spring-pressed automatic type and are relatively so arranged that water is drawn into the displacement chamber of the pump cylinder 12 by way of the valve 17 upon each outward or suction stroke of the cylinder piston and is forced therefrom under pressure by way of the valve 18 upon each inward or pressure stroke of the piston.

Suitably secured to the underside of the base 1 between the supporting legs 2—2 thereof at a point located beneath the motor 3 are a pair of laterally spaced members 21 and 22. The member 21 is axially bored, as at 23, to provide a passage therethrough the rear end of which is connected to the delivery end of the water conduit 20 extending from the water pressure pump, it being observed that this conduit extends about the rear end of the base 1 and thence lengthwise along the underside thereof. The passage 23 of the member 21 is enlarged at its forward end to receive a check valve unit 24, this unit being provided with a tubular coupling member 25 internally fitted with a spring-pressed valve element 26. The check valve 24 is operative to insure unidirectional flow of gas under pressure from its source of supply through the member 25 for preliminary mixing of the gas with water in the member 21, the valve 24 serving further to prevent any flow of the water outwardly of the gas inlet should the gas pressure fall below that of the water supplied to the member 21. The coupling member 25 is adapted to be connected to a conduit leading to a suitable supply (not shown) of carbon dioxide gas of desired pressure, from whence it will appear that water and gas under pressure are simultaneously delivered to opposite ends of the member 21 for preliminary mixing thereof within said member.

The member 22 spaced laterally from the member 21 is provided with a passage 27 extending longitudinally therethrough, the continuity of said passage 27 being interrupted intermediate its length to provide a pair of separated openings 28 and 29 which respectively communicate with a common chamber 30 formed in one side of the body of the member 22. This chamber is in the form of a lateral opening internally threaded to receive a nut 31 into which is axially threaded a stem 32, the inner end of which bears on a flexible diaphragm 33 disposed within the chamber 30. Upon inward movement of the stem 32 against the diaphragm 33, the latter is forced against the opening 28 and so closes the passage 27 against flow of fluid therethrough. The stem 32 is provided at its outer end with an operating handle 34 to thereby provide a convenient manually controlled valve mechanism for controlling the discharge of carbonated water from the member 22, it being observed at this point that the threaded extension 22a of said member may be connected to any suitable conduit or spigot from which the carbonated water produced by the present apparatus may be drawn as desired. Normally, the washer 33 is held by its operating stem 32 in position to maintain the discharge passage for the carbonated water open, the said washer being pressed into valve-closing position only to shut off the delivery of the carbonated water in the event of a leak in the delivery conduit extending beyond the extension 22a. For control of the carbonated water delivered normally from said extension 22a recourse is had to the valve conventionally present in the discharge spigot (not shown). In order to protect the system against development of excessive pressures, the member 22 may be provided with a safety release valve 35 in the form of a unit having a discharge passage 36 normally closed by a spring-pressed valve 37, which valve is set to open at a predetermined developed pressure in the carbonated water delivery line to vent the same to atmosphere by way of the safety port 38.

Oscillatably journalled between the fixed members 21 and 22, upon axially alined tubular pins 39 and 40 respectively extending laterally from said members, is an intermediate member 41 having bored extensions 42 and 43 at its opposite ends, the bores of these extensions extending into the body of the member 22 and being separated from one another by a partition or web 44a (see Figure 16) formed internally of the member 41. The bored extensions 42 and 43 are axially alined and respectively receive the tubular bearing pins 39 and 40 in such manner as to permit free rocking movement of the member 41 about said bearing pins as the axis of oscillation. Preferably, the extensions 42 and 43 are each fitted with gland packing nuts 44—44 to insure a fluid tight connection between the fixed bearing pins and the member 22 oscillatably journalled thereon. It will be noted that alined bores of the coupled extension 42 and pin 39 communicate with each other and with the passage 23 formed in the fixed member 21, while the alined bores of the coupled extension 43 and pin 40 correspondingly communicate with each other and with the carbonated water delivery passage 27 in the fixed member 22.

Secured to and projecting laterally from one end of the rocking member 41 is a conduit 45, this conduit being in communication with the internal recess 42 of said member 41 so that the water and gas mixture preliminarily formed within the fixed member 21 may flow under pressure through the conduit 45 in the direction of the arrow in Figure 14 to a storage chamber, to be described. Secured to and projecting laterally from the opposite end of the rocking member 41 is a second conduit 46, of smaller diameter than the conduit 45, this second conduit 46 being in communication with the internal recess 43 of the member 41 so that carbonated water from said storage chamber to be described, may flow under pressure through the conduit 46 in the direction of the arrow in Figure 14 to the carbonated water discharge member 22.

For storage of the carbonated water produced by the present apparatus, there is provided a hollow tubular tank 47 of suitable capacity having a removable closure plug 48 threaded into the bottom of the tank. The closure plug 48 is provided with a pair of separate passages 49 and 50 each extending from a side of the plug and thence to the inner end thereof, the outer ends of these passages being respectively connected to the free ends of the conduits 45 and 46, that is, to the ends opposite those connected to the oscillating member 41.

The inner end of the passage 49 in the plug 48 is fitted with a conduit 51 the upper terminal end of which is provided with a pair of discharge nozzle tubes 52—52 of relatively restricted diameter. As most clearly appears in Figure 15, these tubes 52—52 are angularly so related as to present their discharge openings in closely spaced registry, in consequence of which the jets of preliminarily mixed gas and water issuing from each under relatively high pressure and velocity impinge against one another and produce an intimate mixture of said gas and water, the homogeneous mixture so produced being discharged more or less spherically from the space formed between the alined discharge openings of the nozzle tubes 52—52.

It will be understood, of course, that the plug 48 and its associated conduits as just described form part of the storage tank assembly, the tank 47 serving as an enclosure for the upstanding conduit when assembled with the plug, the said assembly being supported at the outer end of the conduits 45—46 which constitute, in effect, a lever oscillatable about the horizontal axis of the bearing pins 39—40 to permit vertical displacement of the tank.

Referring now to Figure 6 it will be observed that an open-ended tube 53 is vertically supported on top of the base 1 at a point located immediately above the conduits 45—46 above the tube 35. A spring 54, passing through an opening in the base 1 in registry with the bore of the tube 53, is secured at one end as at 55 to the conduit 45 and at the other end to a pin 56 extending across the upper end of tube 53. The size and the tension of spring 54 is such that the weight of the storage tank 47 and the parts associated therewith, including the closure cap 48 and the tubes 45 and 46, are normally supported in their raised position as shown in Figure 6, when the tank is empty or when the level of carbonated water therein has dropped to a predetermined point. In the raised position of these parts, an arm 57 secured to the tube 45 is in position to actuate an electric switch 58 to start the motor 3 for the purpose of producing a supply of carbonated water. As this water is produced and stored within the tank 47, the increased weight causes the latter together with the tubes 45 and 46 and the member 41 to rock about the pivotal bearing pins 39—40 into a downward position against the normal bias of the tension spring 54. In this lowered position, the arm 57 moves away from the switch 58, thus opening the same to stop the motor 3 and so interrupt the further production of carbonated water. So long as there is a supply of carbonated water sufficient to extend above a predetermined point within the tank, the latter and its associated parts will remain in lowered position and the motor will not operate, but as the supply in the tank is reduced so that the predetermined low level is reached, the spring 54 will raise the tank and its associated parts about the rocking axis into the position of Figure 6, and will cause the arm 57 to actuate switch 58 to operate the motor to resume the production of carbonated water. This cycle of operation is continued so as to insure the production of a full and continuous supply of carbonated water for delivery to the fountain or other place where the same is desired to be used.

The motor need not be operated every time that carbonated water is desired at the fountain as the storage tank may be of large enough capacity to provide for several normal discharges therefrom. In the event of an abnormally large discharge of carbonated water at the fountain so that the combined weight of the storage tank and the carbonated water contained therein is insufficient to overcome the tension of the spring 54, the pull of said spring upon the conduit 45 will raise the same sufficiently to close the motor switch and so place the motor in operation to deliver a further supply of water and gas mixture to the tank, which operation may continue so long as there is a discharge of carbonated water at the fountain, the water and gas mixture simply passing into the storage tank and being discharged therefrom in the form of carbonated water.

In the production of the carbonated water, water from the pump under pressure is forced through the water supply line 20 to the internal bore 23 of the member 21 simultaneously as carbon dioxide gas also under sufficient pressure enters the same bore through the check valve unit 24. Thus, within the bore 23 of the member 21 the gas and water under substantially equal pressures are preliminarily mixed, and this mixture then passes through the hollow bearing pin 39 to one side of the member 21 and thence through the conduit 45 into the storage tank 47 where a homogeneous mixture of the gas and water with maximum absorption of the gas in the water is produced as hereinbefore described. The carbonated water so produced is then delivered, as required, from the tank through the discharge passage 50 of the closure plug 48 and through the conduit 46 to the other side of member 21 and thence through the hollow bearing pin 40 to and through the valve-controlled discharge member 22 for final discharge at the dispensing fountain.

A bracket 59 secured to the base in embracing relation with respect to the pivoted conduits 45—46 provides a satisfactory stop for limiting downward movement of the shiftable tank 47 when the same is filled with a supply of carbonated water.

It will be understood, of course, that the apparatus of the present invention is susceptible of various changes and modifications which may be made from time to time without any departure from the real spirit or general principles of the invention, and it is accordingly intended to claim the same broadly as well as specifically as indicated in the appended claims.

What is claimed as new and useful is:

1. A carbonating apparatus of the character described comprising a carbonated water supply tank, means for mixing together water and carbon dioxide gas at substantially equal pressures, a relatively rigid conduit for delivering the mixture of water and gas to said tank, a second relatively rigid conduit for discharge of said carbonated water from the tank, pivotal mounting means for the ends of the conduits spaced from said tank whereby said conduits constitute in effect a pivoted lever upon which the tank is supported, and means automatically operative to control the operation of said water and gas mixing means upon movement of said lever accordingly as the supply of carbonated water in said tank is varied.

2. A carbonating apparatus of the character described comprising, in combination, means for preliminarily mixing water and carbon dioxide gas under substantially equal pressures, a supply tank for receiving said mixture of water and gas having means disposed internally thereof for further mixing said water and gas mixture to produce carbonated water of high gas content, a conduit for delivering said preliminary mixture to said tank and the internal mixing means thereof, a second conduit for delivering the carbonated water from said tank, said conduits being pivotally mounted at one end thereof to form a lever at the free outer end of which said tank is supported, and means actuatable by movement of said lever to control the delivery of said preliminarily mixed water and gas to said supply tank, the lever movement being determined by the degree to which carbonated water is displaced from the tank.

3. A carbonating apparatus of the character described comprising, in combination, means for preliminarily mixing water and carbon dioxide gas under substantially equal pressures, said means being in the form of a relatively fixed member having an internal chamber commonly connected to the sources of supply of said water and gas and a single outlet passage for delivering therefrom said water and gas mixture, a supply tank for carbonated water, means for delivering carbonated water from said tank, said carbonated water delivery means including a relatively fixed member having a passage spaced from and in coaxial relation to the outlet passage of said first-mentioned member, an intermediate member journalled between said spaced fixed members and being provided with a pair of separate passages respectively in communication with the coaxial passages of said fixed members, a pair of relatively rigid conduits respectively connected to the separate passages of said intermediate member and extending therefrom in close relation to conjointly constitute a lever arm pivoted for rotation about the common axis of said fixed members, said supply tank for the carbonated water being supported by the free ends of said conduits with its interior in communication therewith, and means actuatable by the lever arm aforesaid for interrupting the supply of water to said first-mentioned member when the supply of carbonated water in the tank reaches a predetermined level therein.

4. A carbonating apparatus of the character described comprising, in combination, a storage tank for receiving a supply of carbonated water and for delivering the same therefrom as required, means for supplying to the tank an intimate mixture of carbon dioxide gas and water under pressure pivoted conduit means connected to said tank for respectively delivering thereto and withdrawing therefrom carbonated water, said tank being supported upon the free end of said conduit means for movement about the pivotal axis of said conduit means acting as a lever, means for imparting a normal bias on said conduit means tending to maintain said tank in raised position, and means operative automatically to interrupt the supply of gas and water mixture to the tank when the combined weight of the tank and the carbonated water contained therein is sufficient to overcome the normal bias on said conduit means.

5. A carbonating apparatus of the character described comprising, in combination, an electric-motor-driven water pump for delivering water under pressure for mixture with a carbonating gas of substantially like pressure, a mixing chamber in communication with the discharge side of said pump and with a source of supply of said gas, a conduit having one end thereof connected to the discharge outlet of said mixing chamber for delivering the gas-charged water to a supply tank, a second conduit for delivering the gas-charged water from said tank to a discharge fitting, said conduits being commonly mounted for pivotal movement in a direction paralleling the vertical plane extending lengthwise thereof, a carbonated water supply tank mounted upon the free ends of said pivoted conduits, means for imparting a normal bias on said pivoted conduits tending to maintain said tank in raised position, and means operative automatically to interrupt the operation of said pump when the combined weight of the tank and the carbonated water contained therein overcomes the bias on said pivoted conduits and causes the same to be depressed.

6. An apparatus for producing carbonated water comprising a storage tank for said carbonated water, an oscillatable member having a pair of oppositely projecting coaxial tubular elements rotatably journalled within opposed fixed end supports, a pair of conduits extending laterally of and connected to said oscillatable member for respective communication with said tubular elements, said storage tank being connected to the free ends of said conduits whereby said tank may shift vertically as said conduits move as a lever about the axis of said rotatably journalled tubular elements, means for delivering to said tank a mixture of gas and water under pressure through one of said tubular elements and the conduit in communication therewith, and means for withdrawing carbonated water from said tank through the other of said conduits and the tubular element in communication therewith.

7. An apparatus for producing carbonated water comprising a storage tank for said carbonated water, an oscillatable member having a pair of oppositely projecting coaxial tubular elements rotatably journalled within opposed fixed end supports, a pair of conduits extending laterally of and connected to said oscillatable member for respective communication with said tubular elements, said storage tank being connected to the free ends of said conduits whereby said tank may shift vertically as said conduits move as a lever about the axis of said rotatably journalled tubular elements, means for delivering to said tank a mixture of gas and water under pressure through one of said tubular elements and the conduit in communication therewith, and means for withdrawing carbonated water from said tank through the other of said conduits and the tubular element in communication therewith, and means automatically operative to control the delivery of said mixture of gas and water to the tank accordingly as the volume of carbonated water therein is varied.

8. An apparatus for producing carbonated water comprising a storage tank for said carbonated water, an oscillatable member having a pair of oppositely projecting coaxial tubular elements rotatably journalled within opposed fixed end supports, a pair of conduits extending laterally of and connected to said oscilatabe member for respective communication with said tubular elements, said storage tank being connected to the free ends of said conduits whereby said tank may shift vertically as said conduits move as a lever about the axis of said rotatably journalled tubular elements, means for delivering to said tank a mixture of gas and water under pressure through one of said tubular elements and the conduit in communication therewith, and means for withdrawing carbonated water from said tank through the other of said conduits and the tubular element in communication therewith, said tank being shiftable in response to the volume of carbonated water therein, and means automatically responsive to shifting movement of the tank to control the delivery of said mixture of gas and water thereto.

LOUIS GOTTLIEB.

REFERENCES CITED

The following references are of record in the file of this patent:

UNITED STATES PATENTS

| Number | Name | Date |
|---|---|---|
| 1,043,127 | Mueller | Nov. 11, 1912 |
| 1,055,648 | Murphy | Mar. 11, 1913 |
| 1,505,204 | Kiernan | Aug. 19, 1927 |
| 1,972,994 | Huntley et al. | Sept. 11, 1934 |
| 2,271,896 | Lewis | Feb. 3, 1942 |